Patented Jan. 13, 1925.

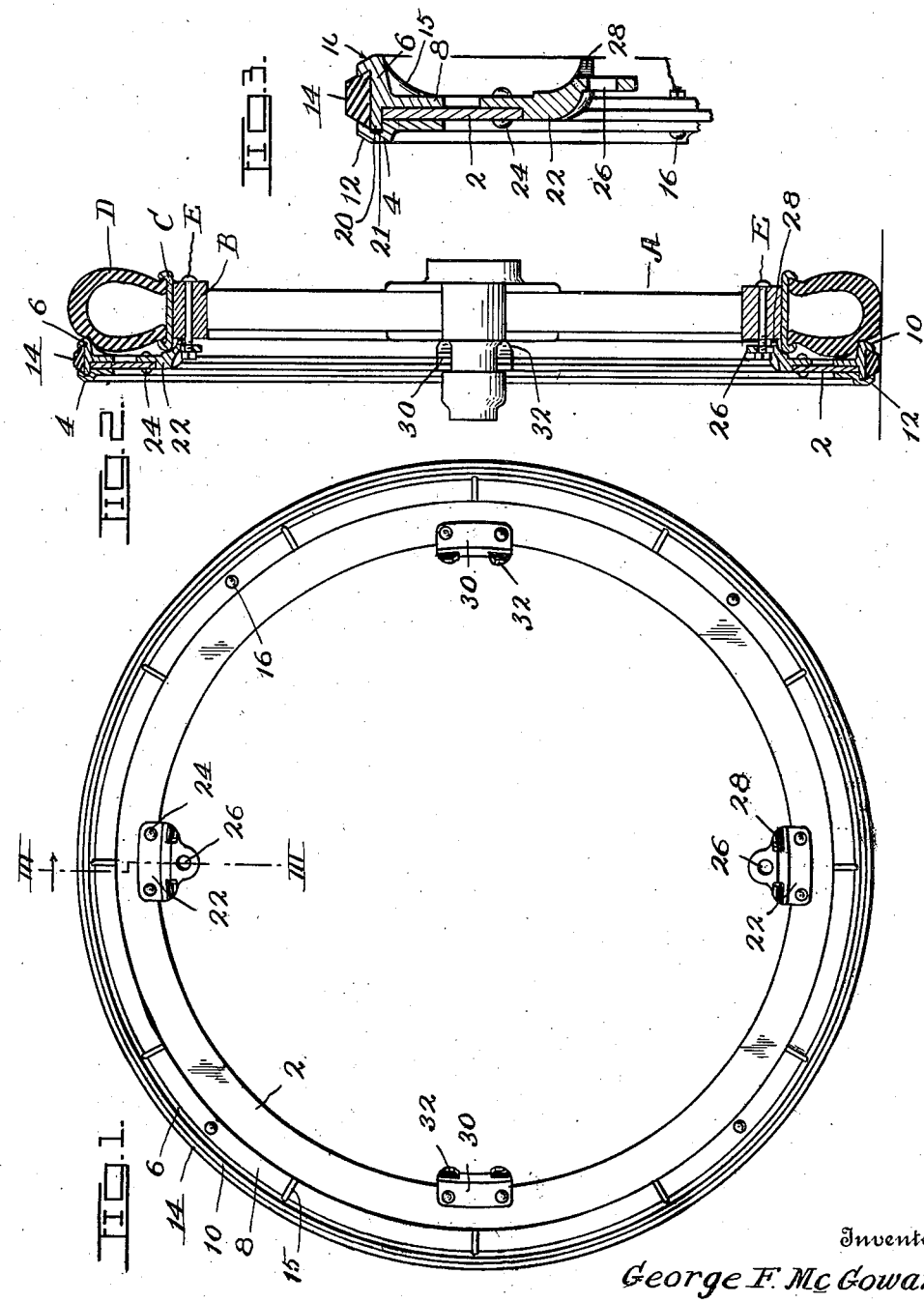

1,523,132

UNITED STATES PATENT OFFICE.

GEORGE F. McGOWAN, OF KANSAS CITY, KANSAS.

ATTACHMENT FOR VEHICLE WHEELS.

Application filed March 19, 1923. Serial No. 626,047.

*To all whom it may concern:*

Be it known that I, GEORGE F. McGOWAN, a citizen of the United States, residing at Kansas City, in the county of Wyandotte and State of Kansas, have invented certain new and useful Improvements in Attachments for Vehicle Wheels, of which the following is a specification.

My invention relates to emergency devices for use on motor vehicle wheels, whereby in the event that any of the pneumatic tires become punctured while running on the road the vehicle can proceed without damage to the punctured tire until such time as it may be convenient to repair the puncture.

The device is so constructed that it can be quickly applied to the vehicle wheel immediately after the occurrence of a puncture, or, if preferred, each wheel may be permanently equipped with one of the devices so that a stop need not be made should a puncture occur, the device being proportioned to relieve the punctured tire of its load and thus protect it from damage such as would occur if required to carry the load while in a deflated condition.

In order that the invention may be fully understood, reference will now be had to the accompanying drawing, in which:

Fig. 1 is a side elevation of the device.

Fig. 2 is a vertical section of the device applied to a vehicle wheel.

Fig. 3 is an enlarged cross section on line III—III of Fig. 1.

A, designates the vehicle wheel having a felly B, a rim C, and a pneumatic tire D, all of which are of ordinary or any preferred construction.

Referring now more particularly to the device constituting the present invention, 2 designates an annular plate provided at its opposite sides with an annular retaining member 4, and an annular rim 6, which reinforce said plate 2. The rim 6 has internal and external annular flanges 8 and 10, respectively, which latter coacts with the peripheral flange 12 of the retaining member 4 in holding a solid rubber or other suitable tire 14 in position upon the rim 6. That portion of the rim 6 adjacent to the pneumatic tire D is reinforced with radial ribs 15, which are curved to fit the general cross sectional contour of said pneumatic tire D said portion also supporting the tire D from lateral displacement when running over a rough road while in a deflated condition, thereby avoiding rim cuts.

The retaining member 4 and the rim 6 are removably secured to the annular plate 2 by suitable means such as bolts 16, so that they may be removed to permit placement of the tire 14 upon the rim 6 and also the replacement of such tire with another when worn out. The margin 20 of the rim 6 projects over the periphery of the annular plate 2 and fits into an annular recess 21 in the retaining member 4 to present a smooth base to the tire 14 and assist the bolts 16 in holding the retaining member 4 in axial alinement with the rim 6.

22 designates a plurality of lugs which are permanently secured to the plate 2 by suitable means, rivets 24 being shown in the present instance. The lugs 22 have eyes 26 arranged to register with the bolt holes in the felly B, so that my device may be secured to said felly B by bolts E, as disclosed by Fig. 2. Each lug 22 has spacing elements 28 to assist the same in holding the device in proper position upon the felly B.

The diameter of the tire 14 is, preferably, slightly less than that of the pneumatic tire D, so that said tire 14 will not rest upon the ground, except when the pneumatic tire D becomes deflated, in which event the tire 14 will carry the load and thereby protects the pneumatic tire D from damage, as hereinbefore stated.

The device is equally adaptable to both passenger vehicles and trucks.

From the foregoing it will be understood that I have provided a device embodying the advantages above pointed out, and while I have shown the preferred construction, combination and arrangement of parts, I reserve the right to make such changes as properly fall within the spirit and scope of the claims.

Having thus described my invention, what I claim and desire to secure by Letters Patent, is:

1. A device of the character described consisting of an annular plate, means for removably securing said plate to the felly of a wheel equipped with a pneumatic tire, a rim secured to said plate to reinforce the same and provided with a peripheral flange extending laterally in opposite directions and one side of which abuts said pneumatic tire, spaced reinforcing means for said rim and its flange and curved to fit the general cross sectional contour of the pneumatic tire, and a tire mounted on said rim.

2. A device of the character described consisting of an annular plate, lugs on said plate adapted to be secured to the felly of a wheel equipped with a pneumatic tire and provided with spacing elements which abut said felly, a rim secured to said plate to reinforce the same and provided with a peripheral flange extending laterally in opposite directions and one side of which abuts said pneumatic tire, spaced reinforcing means for said rim and its flange and curved to fit the general cross sectional contour of the pneumatic tire, and a tire mounted on the peripheral flange of said rim.

In testimony whereof I affix my signature in the presence of two witnesses.

GEORGE F. McGOWAN.

Witnesses:
 L. J. FISCHER,
 F. C. FISCHER.